Jan. 22, 1924.

R. E. HELLMUND 1,481,318

CONTROL SYSTEM FOR INDUCTION MOTORS

Filed Dec. 14, 1918  6 Sheets-Sheet 1

WITNESSES:

INVENTOR
Rudolf E. Hellmund.
BY
ATTORNEY

Jan. 22, 1924. 1,481,318
R. E. HELLMUND
CONTROL SYSTEM FOR INDUCTION MOTORS
Filed Dec. 14, 1918  6 Sheets-Sheet 2
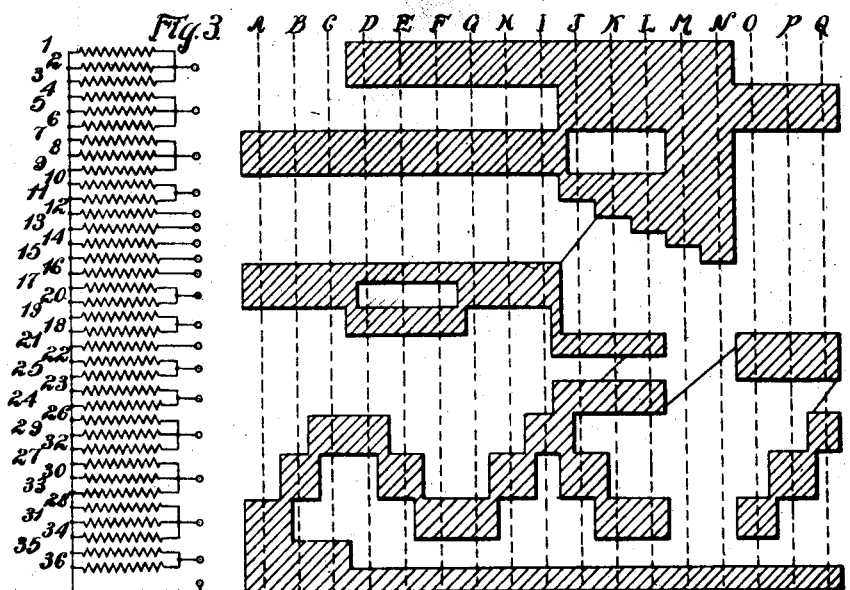
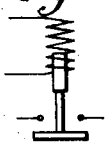
WITNESSES:
INVENTOR
Rudolf E. Hellmund
BY
ATTORNEY

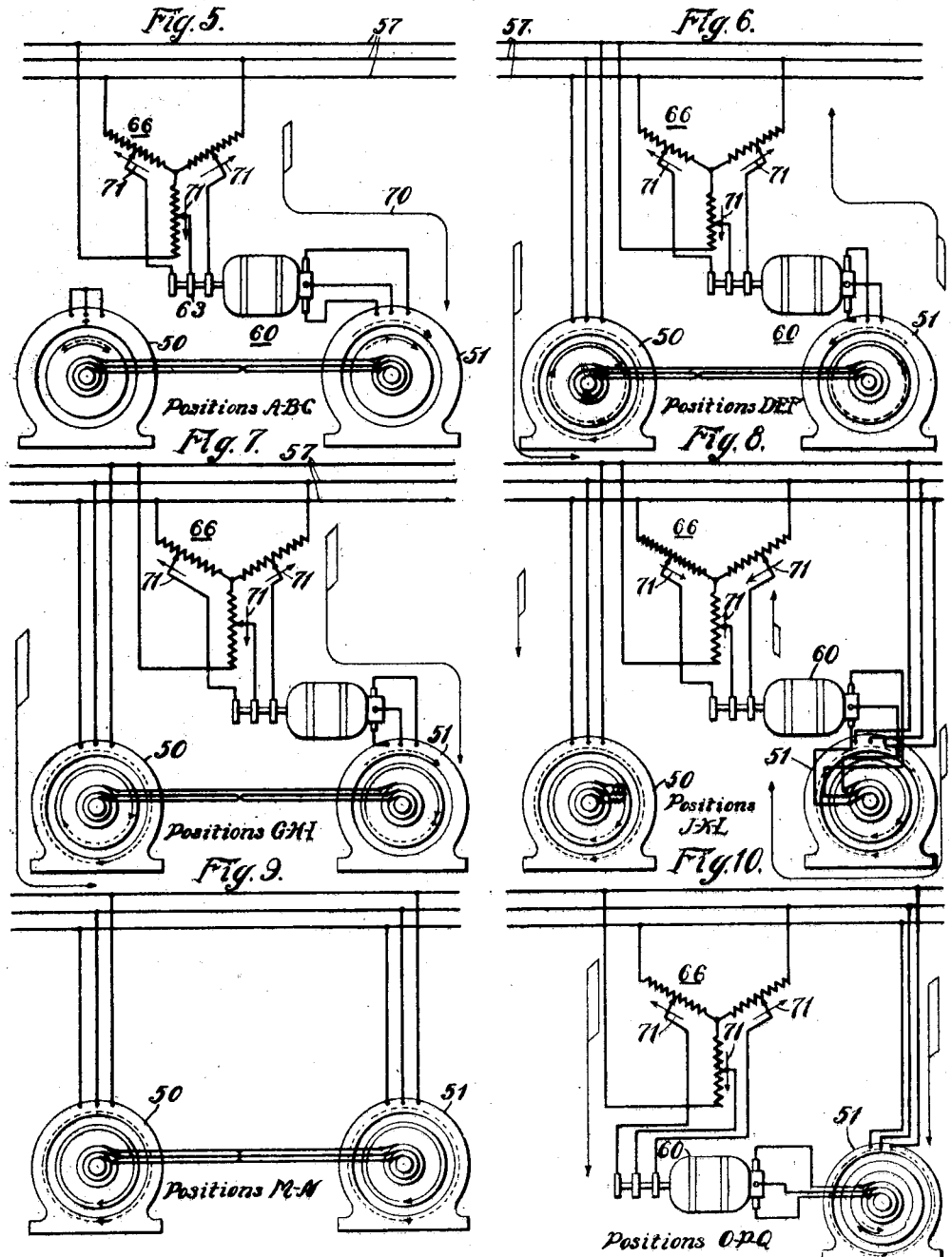

Jan. 22, 1924.  
R. E. HELLMUND  
1,481,318  
CONTROL SYSTEM FOR INDUCTION MOTORS  
Filed Dec. 14, 1918  6 Sheets-Sheet 4

WITNESSES:

INVENTOR  
Rudolf E. Hellmund.  
BY  
ATTORNEY

Jan. 22, 1924.
R. E. HELLMUND
1,481,318
CONTROL SYSTEM FOR INDUCTION MOTORS
Filed Dec. 14, 1918    6 Sheets-Sheet 5

WITNESSES:

INVENTOR
Rudolf E. Hellmund.
BY
ATTORNEY

Jan. 22, 1924.    1,481,318
R. E. HELLMUND
CONTROL SYSTEM FOR INDUCTION MOTORS
Filed Dec. 14, 1918    6 Sheets-Sheet 6

WITNESSES:
H. J. Shelhamer
a.a. Brand

INVENTOR
Rudolf E. Hellmund
BY
ATTORNEY

Patented Jan. 22, 1924.

1,481,318

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

CONTROL SYSTEM FOR INDUCTION MOTORS.

Application filed December 14, 1918. Serial No. 266,747.

*To all whom it may concern:*

Be it known that I, RUDOLF E. HELLMUND, a citizen of the German Empire, and a resident of Swissvale, in the county of Allegheny and State of Pennsylvania, have invented a new and useful Improvement in Control Systems for Induction Motors, of which the following is a specification.

My invention relates to systems of control for induction motors, and it has for its object to provide a system of the character designated wherewith a plurality of induction motors may be accelerated in a smooth and uniform manner by the use of an auxiliary frequency-changer of relatively small size and weight, either with or without the temporary use of relatively small rheostats.

Figure 1:
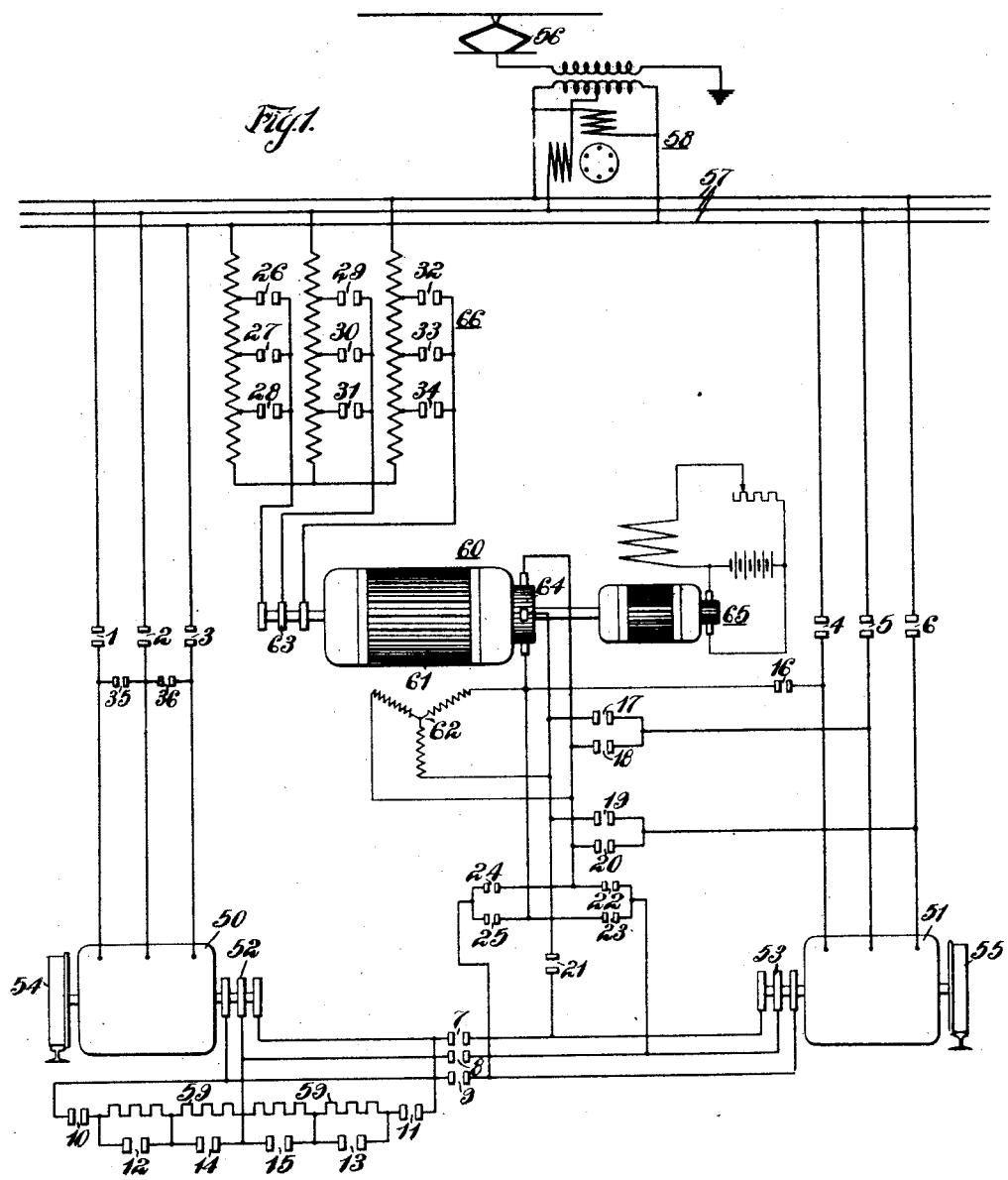
Figure 11:
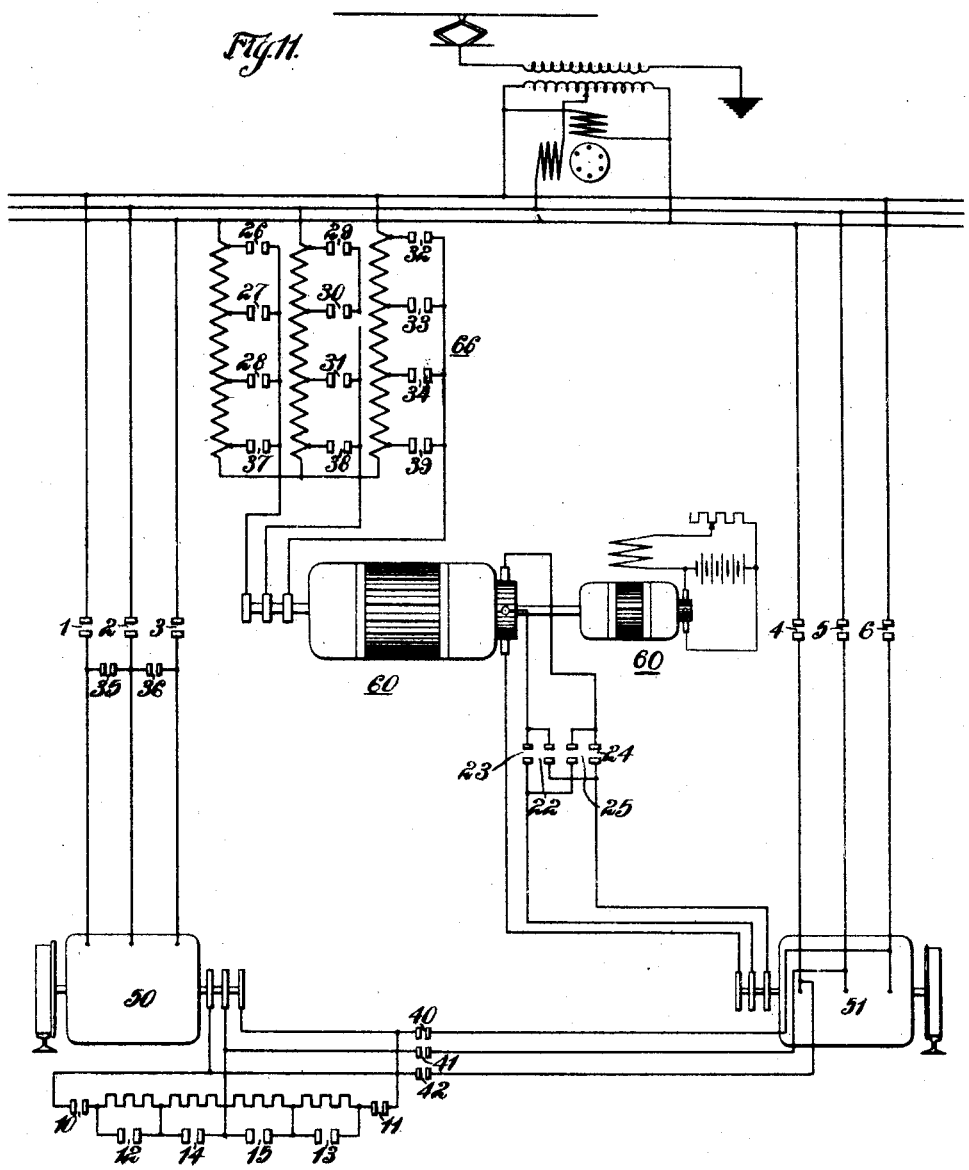
Figures 12, 13:
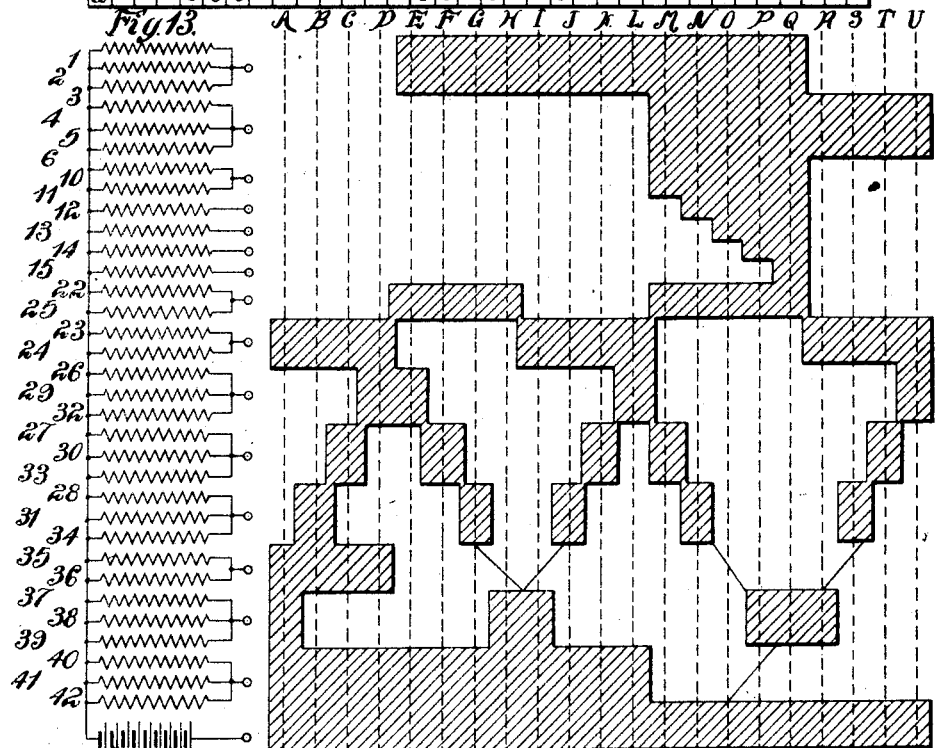

In the accompanying drawing, Fig. 1 is a diagrammatic view of a pair of induction motors, together with attendant frequency-changer and other auxiliary apparatus, embodying one form of my invention; Fig. 2 is a sequence chart showing the proper order of operation of the switches in the system of Fig. 1; Fig. 3 is a developed view of a controller which may be employed to operate the switches of Fig. 1 in accordance with the chart of Fig. 2; Fig. 4 is a diagrammatic view of an electrically-operated switch which may be employed in the system of Fig. 1; Figs. 5 to 10, inclusive, are simplified diagrammatic views explanatory of the development of the connections in the system of Fig. 1; Fig. 11 is a diagrammatic view of a modification of the system shown in Fig. 1; Figs. 12 and 13 are sequence charts and developed controller respectively for the operation of the switches in the system of Fig. 11; and Figs. 14 to 18, inclusive, are simplified diagrammatic views illustrating the development of the connections in the system of Fig. 11.

In starting and accelerating induction motors, it is undesirable to employ resistance in series with the secondary windings thereof because of the large cost and weight of such resistance and the excessive energy loss produced therein. Furthermore, in certain types of installation, as, for example, in railway locomotives, where the use of liquid resistors has been usual, it may frequently happen that the atmospheric temperature is so low as to freeze the fluid of the resistor.

It has, therefore, been proposed to employ frequency-changers in conjunction with induction motors, such frequency-changers serving to transfer energy from the secondary member of the induction motor to the line, or vice versa, with relatively small losses.

In my application Serial No. 119,868, filed September 13, 1916, patented Nov. 26, 1918, No. 1,285,698, I describe and claim a system wherein, at the outset, energy is supplied, through a frequency-changer, to the rotor windings of two induction motors, such rotor windings acting as primary members and the stator windings being short circuited for secondary operation. After a certain speed has been developed, the two motors are connected for cascade operation, energy being supplied to the stator of one, the corresponding rotor winding acting as a secondary member and supplying energy to the rotor winding of the remaining motor for primary operation, the stator winding of the remaining motor being short-circuited for secondary operation.

For still further acceleration, the stator windings of both motors are connected to the line for primary operation and the rotor windings serve as secondary members, transferring energy back to the source through the frequency-changer and associated adjustable transformer.

As the final step in the operation, the motors operate in parallel from the source, with closed-circuit secondary windings.

In my copending application, Serial No. 168,664, filed May 5, 1917, patented Nov. 29, 1921, No. 1,398,515, I disclose a similar system wherein, at the outset, the two induction motors are connected in cascade, and energy is supplied from the foot of the cascade aggregate, through the frequency-changer, to the source. For further acceleration, the direction of phase rotation within the frequency-changer is reversed and the two induction motors remain in cascade, energy being supplied both to the head and to the foot of the cascade aggregate. As a final step, the induction motors are operated in parallel.

In both of the above-described systems, it is necessary to employ a frequency-changer having substantially one-half the capacity of the induction motors to be accelerated but, according to the present invention, I am enabled to produce a similar result by the employment of a frequency-changer the capacity of which is only about one-fourth that of the motors to be accelerated.

Referring to the system disclosed in Figs. 1 to 10, inclusive, induction motors are shown at 50 and 51, said motors having wound rotors terminating in suitable slip rings 52 and 53. The motors 50 and 51 are shown applied to a railway locomotive and their rotors are accordingly coupled to drive-wheels 54 and 55.

Energy for the operation of the motors 50 and 51 is derived from a trolley 56 in single-phase form and is transformed into polyphase form for supply to suitable mains 57 through a phase-converter 58 of the usual type.

The stator terminals of the motor 50 may be connected to the mains 57 through suitable switches 1, 2 and 3, and, in like manner, the stator terminals of the motor 51 may be connected to the mains 57 through suitable switches 4, 5 and 6. The rotor terminals 52 may be connected to the rotor terminals 53 by the closure of suitable switches 7, 8 and 9. The slip rings 52 may further be interconnected through different portions of resistors 59—59 by the manipulation of suitable switches 10 to 15, inclusive.

A frequency-converter or frequency-changer 60 of any well-known type, here shown as having the structure described and claimed in U. S. Patent No. 1,235,583, issued to the Westinghouse Electric & Manufacturing Company, Aug. 7, 1917, on an application filed by F. W. Meyer, may be provided for control of the motors 50 and 51 and, as set forth in the aforementioned patent, comprises an armature 61 rotating within the influence of a field winding 62 and provided with slip rings 63 at one end thereof and a commutator 64 at the other end thereof. The armature 61 may be driven at varying speeds, either by altering the excitation of the field winding 62 or through a suitable variable-speed driving motor 65. Energy of adjustable voltage may be supplied to the slip rings 63 from the mains 57 through a three-phase auto-transformer 66 by the manipulation of suitable switches 26 to 34, inclusive. Polyphase brushes, bearing upon the commutator cylinder 64, may be connected to the stator terminals of the motor 51, in either direction of phase rotation, by the manipulation of suitable switches 16 to 20, inclusive, and, in like manner, the brushes of the commutator 64 may be connected to the rotor terminals of the motor 51, in either direction of phase rotation, by the manipulation of suitable switches 21 to 25, inclusive.

The stator terminals of the motor 50 may be inter-connected by suitable switches 35 and 36.

The switches 1 to 36 may be of any desired form, my invention residing in the order of switch operation rather than in any distinctive type or arrangement of switches. Said switches may either be of the electromagnetically or pneumatically operated type and, if of the electromagnetically operated type, they may assume the form shown in Fig. 4, the operating coils of the different switches being energized in the predetermined sequence, as by control segments indicated in developed form in Fig. 3.

In the following description of the operation of a system embodying my invention, attention is directed to the rotational arrows in Figs. 5 to 10, inclusive, and in Figs. 14 to 18, inclusive. The mechanical rotation of the rotor and stator members, both in direction and in magnitude, is shown by the full-line arrows, while the magnitude and the direction of the fields of the two members are shown by the dotted-line arrows. In all cases, it is assumed that the synchronous speed of the fields is represented by 360° and it will be observed, therefore, that, when either member is connected directly to the source of energy, the field speed in that member is represented by 360°. Moreover, as the speed of the motor aggregate gradually increases, it will be seen that the solid rotational arrows on the rotors of the motors gradually lengthen until a speed in excess of synchronism is reached. By following the variations in the lengths and directions of these two systems of arrows, the interrelation between the mechanical and field rotation of the various members may be observed with little effort.

Upon moving the controller of Fig. 3 to the position A, the switches 7, 8, 9, 16, 17, 20, 28, 31, 34, 35 and 36 are closed to establish the connections of Fig. 5. Energy is derived from the mains 57, converted in voltage in the transformer 66 and in frequency in the machine 60 and supplied to the stator of the motor 51. Secondary energy, flowing from the rotor of the motor 51, is transferred to the rotor winding of the motor 50, acting as a primary member, and the stator winding of the motor 50 is closed-circuited for secondary operation. Thus, the motors 50 and 51 operate in cascade, deriving all their energy through the converter 60, as indicated by an arrow 70. In this figure, the solid arrows on the rotors of the motors indicate a 45°, or approximately one-eighth synchronous speed, the remaining arrows being accordingly interrelated. When the controller occupies positions B and C, the switches 26 to 34, inclusive, are manipulated to raise the voltage supplied to the slip ring 63, this action being indicated by arrows 71—71 in Fig. 5 and the speed of rotation of the frequency-changer 60 is simultaneously lowered to raise the frequency of the current supplied therefrom.

When substantially one-fourth synchronous speed of the individual motors is obtained, the controller is moved to the position D to energize the switches 1, 2, 3, 18 and 19 and to open switches 17, 20, 35 and 36, thus establishing the connections shown in Fig. 6. Energy is supplied from the mains 57 to the stator of the motor 50 for primary operation thereof, and energy, flowing from the rotor winding of the motor 50, is transferred to the rotor winding of the motor 51 for primary operation thereof. The frequency-changer 60 remains between the stator winding of the motor 51 and supply-mains but its direction of phase rotation is reversed, whereby the stator winding of the motor 51 is permitted to operate as a secondary member and to transfer energy to the mains 57 through the machine 60. As seen by reference to the solid arrow, a speed of substantially 3/8 of synchronism now prevails. In the controller positions E and F, the ratio of transformation in the transformer 66 is increased, as indicated by the arrows 71—71, and the speed of rotation of the frequency changer 60 is increased, thus lowering the secondary voltage and frequency of the motor 51 and permitting the acceleration of the cascade aggregate.

Upon attaining substantially one-half synchronous speed of the individual motor, the direction of phase rotation between the machine 60 and the motor 51 is again changed, by opening the switches 18 and 19 and by closing the switches 17 and 20 (position G), whereupon the connections shown in Fig. 7 are established, approximately 5/8 of synchronous speed prevailing, as shown by the solid arrows having a length of 135°. Energy flows from the mains 57 through the motor 50 to the rotor winding of the motor 51, and energy is likewise supplied to the stator winding of the motor 51 through the machine 60. In the controller positions H and I, the voltage supplied to the stator winding of the motor 50 is again raised at the transformer 66, as indicated by the arrows 71—71, and the speed of rotation of the frequency-changer 60 is lowered, thus serving to still further accelerate the cascade aggregate.

Having attained substantially three-fourths of synchronous speed in the individual motors, the switches 7, 8 and 9 are opened in the position J and the motors are thus cut apart. The solid arrows are now 315° in length, which indicates a field speed in the rotor of but 45°, thus showing that approximately 7/8 of synchronous speed has been reached. The switches 10 to 15, inclusive, are thereupon manipulated to vary the effect of the resistors 58 and 59 in the secondary circuit of the motor 50, the gradual elimination of this resistor bringing said motor to substantially synchronous speed, as indicated in Fig. 8. At the same time, the frequency-changer 60 is employed to gradually reduce the secondary voltage of the motor 51 which has been connected to derive energy directly from the mains 57 through the closure of the switches 4, 5 and 6. The manipulation of the resistors 58 and 59 and of the ratio of transformation in the transformer 66, brings the two motors to substantially synchronous speed in the position L, whereupon their rotor windings, operating as secondary members, may be short circuited, as indicated in Fig. 9, and as brought about by the connections of positions M and N. Obviously, the length of all arrows, both full-line and dotted-line, should now be 360°, since, in the beginning, we assumed this length as representing synchronous speed.

It is occasionally desirable to operate above synchronous speed but, under these conditions, the draw-bar pull is generally small so that the propulsive effort may be supplied by less than the full number of motors. I may entirely disconnect the motor 50, therefore, and carry the motor 51 above synchronism by supplying energy to both windings thereof, the phase rotation of the energy supplied to the secondary winding through the converter 60 being in the proper direction for over-synchronous rotation. The arrows indicate a speed of 9/8 true synchronism, and it will be observed that the arrow representing the field speed in the rotor member is now of appreciable magnitude and, therefore, indicates over-synchronous operation. By raising the secondary voltage through the adjustment of the transformer 66, as indicated in Fig. 10, the motor 51 may be brought to substantially one and one-fourth times synchronous speed (position OP and Q).

From the above, it will be noted that, by the use of a frequency-changer having substantially one-fourth the motor capacity, I am enabled to obtain full speed in a plurality of motors, with relatively small rheostatic losses, and, at the same time to operate the frequency-changer at such frequency and currents as to facilitate the securing of good commutation therein.

In the system of Fig. 1, the frequency-changer 60 is, at times, connected to the stator winding and, at times, is connected to the rotor winding of the motor 51. Similar results may be secured by maintaining the frequency-changer in connection with the rotor winding of the motor 51 at all times, as indicated in Fig. 11. The connections of this figure are otherwise the same as shown in Fig. 1, with the exception that the rotor terminals of the motor 50 may be connected to the stator terminals of the motor 51, respectively, through suitable switches 40, 41 and 42.

In the description of the operation of the system of Fig. 11, it is unnecessary to go into as full detail as in the discussion of Fig. 1 because of many points of similarity between the two systems, and attention will, therefore, be but briefly directed to the sequence chart, together with the explanatory diagrams of Figs. 14 to 18, inclusive. In the explanatory diagrams, the rotational arrows function in exactly the same manner as hereinbefore described in connection with Figs. 5 to 10, inclusive.

In controller positions A, B, C and D (Fig. 14), the motors are concatenated, and an increasing voltage is supplied to the primary (rotor) terminals of the motor 51, the secondary (stator) terminals of the motor 50 being mutually interconnected. In controller positions E, F, G and H (Fig. 15) the motors are still concatenated but energy is supplied to the motor 50 from the line and is transferred from the secondary (rotor) terminals of the motor 51 to the line through the frequency-changer 60.

In controller positions I, J, K and L (Fig. 16), the motors remain in concatenation but are carried above the synchronous concatenation speed by supplying energy to the foot of the cascade aggregate through the frequency changer and increasing the voltage of the energy thus supplied.

In controller positions M to Q, inclusive, the motors are separately accelerated to their individual synchronous speeds, as in Fig. 8, and in the remaining positions (Fig. 18) the motor 51 is carried into hypersynchronism through the use of frequency-changer 60, as in Fig. 10.

While, in the foregoing description, I have directed attention mainly to motor operation, it should be borne in mind that all the connections described are of equal value in adjusting the braking effect during recuperation but I have deemed it unnecessary to complicate the controller and other portions of the showing by indicating the recuperative positions.

Moreover, I have described my invention in connection with a cascade aggregate comprising two motors, but it is obvious that a frequency-changer may be similarly employed with a cascade aggregate containing a greater number of motors or in connection with a single motor only.

Figure 14:
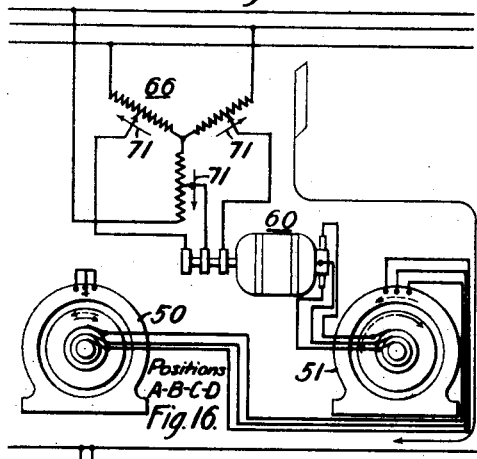
Figure 15:
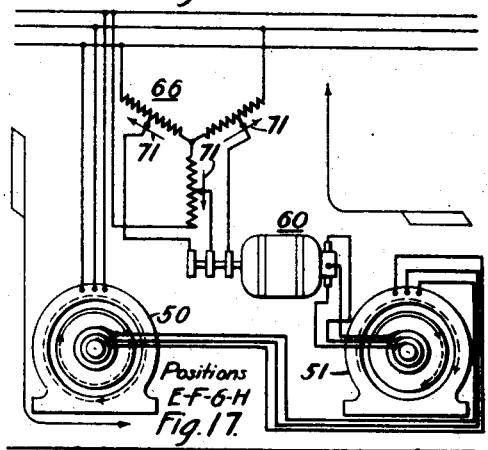
Figure 16:
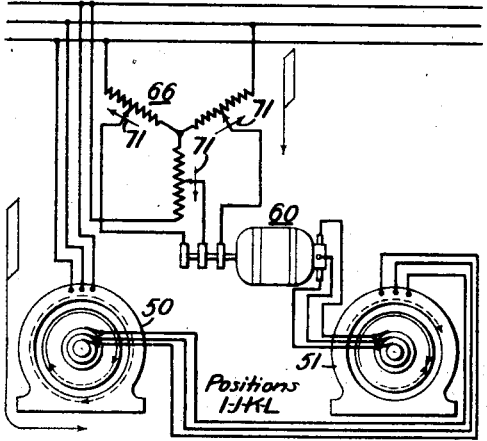
Figure 17:
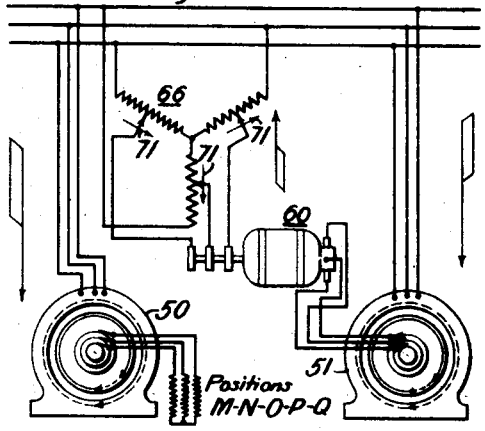
Figure 18:
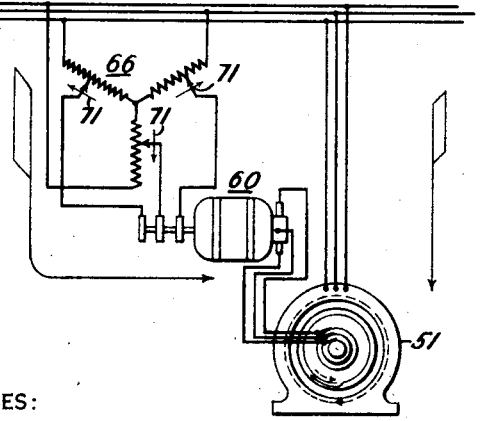

In respect to the broader applications of the first three steps of my system, as illustrated in Figs. 5 to 7 or in Figs. 14 to 16, the present application is a continuation, in part, of my copending application, Serial No. 251,381, filed August 26, 1918, for a speed control system for induction motors.

Certain of the features of the cascade connections are shown also in my application, Serial No. 251,380, filed August 26, 1918, of which the present application is also a continuation in part.

While I have shown my invention in only two of its preferred forms, it will be obvious to those skilled in the art that it is susceptible of various minor changes and modifications without departing from the spirit thereof and I desire, therefore, that only such limitations shall be placed thereupon as are imposed by the prior art or are specifically set forth in the appended claims.

I claim as my invention:

1. The method of utilizing a cascade motor aggregate and a frequency changer operating from a source of constant frequency in such manner as to reduce the required size of the frequency changer, which consists in initially connecting said motors in cascade and supplying energy to one end of said cascade aggregate through said frequency changer, then supplying energy to the head of said cascade aggregate directly from said source and regenerating energy from the foot of said aggregate through said frequency changer, then supplying energy to the foot thereof through said frequency changer and then operating said motors in parallel from said source.

2. The method of accelerating a plurality of induction motors from a source of alternating current by the use of an adjustable-ratio frequency-changer and suitable connections, which comprises initially connecting said motors in cascade and supplying energy to one end of said cascade aggregate through said frequency-changer, then supplying energy to the head of said aggregate directly from said source and recuperating energy from the foot thereof through said frequency-changer and then supplying energy to the head of said aggregate directly from said source and also supplying energy to the foot thereof through said frequency-changer.

3. In a combination including a transmission line, a frequency changer connected thereto, and a pair of induction machine units adapted to be connected to said line or to said frequency changer for interchange of power with said line, the method of operating said induction machine units at variable speeds, which consists in connecting said induction machine units to said frequency changer alone for speeds up to substantially one-fourth of synchronous speed, connecting in cascade with one end connected to said line and the other end connected to said frequency changer for speeds between substantially one-fourth and substantially one-half of synchronous speed, said last-mentioned connections being such that energy is received from the line at one end and returned to the line at the other end of said cascade aggregate, reversing the phase-sequence of the frequency-changer connections for speeds between substantially one-half and substantially three-fourths of synchronous speed, and operating said induction machine units in parallel with said line for speeds between substantially three-fourths of synchronous speed and approximately full synchronous speed.

4. The method of securing an economical utilization of an auxiliary source of relatively low variable frequencies in connection with a main source of relatively high constant frequency to accelerate a cascade-motor aggregate having connections for operation at speeds corresponding either to a low pole-number or double said low pole-number, said method consisting in initially connecting said aggregate, with the double pole-number connection, to said auxiliary source alone and increasing the frequency thereof up to substantially half the frequency of said main source, then connecting one end of said aggregate, with said double pole-number connection, to said main source, connecting the other end, with reversed phase-rotation, to said auxiliary source and decreasing the frequency to substantially zero, then again reversing the phase-rotation of the auxiliary-source connections and increasing the frequency to substantially half the frequency of said main source, then connecting one end of the aggregate, with the low pole-number connection, to said main source, connecting another end, with reversed phase-rotation, to said auxiliary source, and again reducing the frequency to substantially zero, and then operating said mechanism, with said low pole-number connection, from said main source alone.

5. The method of securing an economical utilization of an auxiliary source of relatively low variable frequencies in connection with a main source of relatively high constant frequency to accelerate a pair of induction motor units with a minimum utilization of secondary resistances, said method consisting in initially energizing said motor units in cascade from said auxiliary source alone and increasing the frequency thereof up to substantially half the frequency of said main source, then connecting one end of said cascaded motor units to said main source, connecting the other end, with reversed phase-rotation, to said auxiliary source and decreasing the frequency of said auxiliary source to substantially zero, then again reversing the phase-rotation of the auxiliary-source connections and increasing the frequency to substantially half the frequency of said main source, and then connecting the primary members of said motor units in parallel to said main source, connecting one of the secondary members to said secondary resistances and the other of the secondary members to the auxiliary source with reversed phase-rotation and simultaneously reducing said resistances and the frequency of said auxiliary source.

6. The method of securing an economical utilization of an auxiliary source of relatively low variable frequencies in connection with a main source of relatively high constant frequency to accelerate a cascade-motor aggregate having connections for operation at speeds corresponding either to a low pole-number or double said low pole-number, said method consisting in initially connecting said aggregate, with the double pole-number connection, to said auxiliary source alone and increasing the frequency thereof up to substantially half the frequency of said main source, then connecting one end of said aggregate, with said double pole-number connection, to said main source, connecting the other end, with reversed phase-rotation, to said auxiliary source and decreasing the frequency to substantially zero, then again reversing the phase-rotation of the auxiliary-source connections and increasing the frequency to substantially half the frequency of said main source, and then supplying energy to the primary windings of said aggregate, with the low-pole number connections, deriving energy from the secondary windings and supplying the same partly to a secondary rheostat and partly to said auxiliary source with reversed phase-rotation connections and simultaneously reducing the resistance of said rheostat and the frequency of said auxiliary source.

In testimony whereof, I have hereunto subscribed my name this 4th day of Dec., 1918.

RUDOLF E. HELLMUND.